(12) United States Patent
Lu et al.

(10) Patent No.: US 6,330,381 B1
(45) Date of Patent: Dec. 11, 2001

(54) METHODS, SYSTEMS, MEDIA AND SIGNALS FOR DETERMINING OPTIMUM PRE-COMPENSATION AND OPTIMIZATION OF AN OPTICAL SYSTEM

(75) Inventors: Zhuo Jun Lu, Nepean; Kee Leng Wah, Kanata, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/608,137

(22) Filed: Jun. 30, 2000

(51) Int. Cl.$^7$ .............................. G02B 6/28; H04B 10/00
(52) U.S. Cl. .............................. 385/24; 385/37; 385/123; 359/161
(58) Field of Search .................................. 385/15, 16, 24, 385/27, 28, 30, 31, 122–123, 37; 359/115, 127, 161, 114

(56) References Cited

U.S. PATENT DOCUMENTS

| | | | |
|---|---|---|---|
| 5,568,583 | * 10/1996 | Akasaka et al. | 385/123 |
| 5,680,491 | * 10/1997 | Shigematsu et al. | 385/24 |
| 5,859,939 | * 1/1999 | Fee et al. | 385/24 |
| 5,982,530 | * 11/1999 | Akiyama et al. | 359/279 |
| 6,031,955 | * 2/2000 | Muskasa et al. | 385/123 |
| 6,137,604 | * 10/2000 | Bergano | 359/124 |
| 6,178,279 | * 1/2001 | Mukasa et al. | 385/123 |
| 6,222,957 | * 4/2001 | Lin et al. | 385/24 |
| 6,266,464 | * 7/2001 | Day et al. | 385/37 |

OTHER PUBLICATIONS

Ekaterina A. Golovchenko, Neal S. Bergano, Carl R. Davidson, and Alexei N. Pilipetskii, "Modeling vs Experiments of 16×10 Gb/s WDM Chirped RZ Pulse Transmission over 7,500 km", OFC/IOOC '99 Technical Digest, vol. 3, 1999, pp. 246–248.

F. Favre, D. Le Guen and T. Georges, "Experimental evidence of pseudo–periodical solution propagation in dispersion–managed link", Electronics Letters, vol. 34, No. 19, Sep. 17, 1998, pp. 1868–1869.

F. Neddam, P. Le Lourec, B. Biotteau, P. Poignant, E. Pincemin, J.P. Hamaide, O. Audouin, E. Desurvire, T. Georges and F. Favre, "Analytical optimisation of dispersion–managed solution propagation in long–haul WDM systems and experimental verification", Electronic Letters, vol. 35, No. 13, Jun. 24, 1999, pp. 1093–1904.

* cited by examiner

*Primary Examiner*—Brian Healy

(57) ABSTRACT

Methods, media and signals for determining optimum pre compensation in an optical system. A first method involves receiving a pre-compensation ratio value representing a ratio of dispersion and length to optimum pre-compensation, for a span of optical medium in said optical system and producing a system precompensaton value as a function of dispersion and length of each span in said optical system such that differences between actual pre-compensation and optimum pre-compensation in each span of said system are minimized, A second method involves producing an optimum pre-compensation value $P_{wdm}$ by balancing power profiles in the positive and negative chirped regions of the system, for pulses emitted into an optical medium of the system. A method of optimizing performance of an optical system, using pre-compensation is also disclosed.

41 Claims, 6 Drawing Sheets

METHODS, SYSTEMS, MEDIA AND SIGNALS FOR DETERMINING OPTIMUM PRE-COMPENSATION AND OPTIMIZATION OF AN OPTICAL SYSTEM

BACKGROUND OF THE INVENTION

1. Field of Invention

This invention relates to optical systems and more particularly to methods media and signals for determining optimum pre-compensation and performance of an optical system.

2. Description of Related Art

Dispersion managed RZ systems have been widely studied for use in large capacity digital transmission systems. Such systems typically involve an optical system comprised of a plurality of optical links. Each optical link may present some degree of dispersion to signals transmitted on the medium. Normally such dispersion is reduced by use of a dispersion compensation module (DCM). However, such modules do not perfectly reduce dispersion and each one may compensate its respective optical medium to a different degree. There are statistical variations in dispersion and dispersion slope in DCMs and length variations in optical media which make it difficult to optimize the pre-compensation required for improving system performance.

As a result of the above variations, optimization of pre-compensation has become increasingly important for improving system performance, especially in the real field deployment of the system, where transmission link design restrictions and fiber properties are far from ideal. Dispersion by each span of an optical system is often represented by a dispersion map. It has been known that optimum pre-compensations vary significantly with dispersion maps. Without optimization of the pre-compensation, system performance can be severely penalized. Simple and effective procedures for calculating the optimum pre-compensations for different dispersion maps do not exist Current methods for calculation involve running simulations on every individual dispersion map.

Work by F. Favre et al. entitled "Experimental evidence of pseudo-periodical solution propagation in dispersion-managed link", in Electronics Letters, Vol. 34, No. 19, p1868, (1998); and F. Neddam et al. entitled "Analytical optimization of dispersion-managed solution propagation in long-haul WDM systems and experimental verification", in Electronics Letters, Vol 35, No. 13, p1093, (1999) have addressed the problem of pre-compensation. These works suggest an optimization method involving calculating the optimum solution pulse breathing conditions in single channel or WDM systems. Although qualitative agreements have been achieved between the theory and experiments, the method involves complicated calculations, which must be repeated whenever a dispersion map or wavelengths in a WDM system change.

Work by Ekaterina A. Golovchenko et al. entitled "Modeling vs Experiments of 16×10 Gb/s WDM Chirped RZ Pulse Transmission over 7500 km", in OFC/IOOC '99. Technical Digest, vol.3, p. 246, (1999) has also addressed the problem. This work suggests a simulation technique, through which the optimum pre-compensation can be obtained during the optimization of system performance. The simulation technique is intended for system performance optimization rather than a procedure for calculating optimum pre-compensation and again, the suggested process must be repeated in the event of a dispersion map or wavelength change.

A simple and effective method to calculate the optimum pre-compensations for different dispersion maps is very much desired.

SUMMARY OF THE INVENTION

The problems described above are addressed by providing a method of determining optimum pre-compensation in an optical system. The method may involve receiving a pre-compensation ratio value representing a ratio of dispersion and length to optimum pre-compensation, for a span of optical medium in the optical system and producing a system pre-compensation value as a function of the pre-compensation ratio value and dispersion and length of each span in the optical system, Producing the system pre-compensation value may involve producing a system pre-compensation value such that differences between actual pre-compensation and optimum pre-compensation in each span of the system are minimized.

Producing the system pre-compensation value may comprise producing a system precompensaton value such that the performance of the system is optimized, and performance may be determined to be optimized when an eye diagram produced by the system is optimized, or when the signal quality Q of a signal produced by the system is optimized.

The method may further involve producing the pre-compensation ratio in response to dispersion, length and optimum pre-compensation determined from an ideal dispersion map, for a span of optical medium in the optical system. An ideal dispersion map is a representation of dispersion versus distance for a system having spans of optical medium of constant dispersion at a given wavelength and equal length and DCMs which perfectly compensate the dispersion created in each corresponding span.

In one embodiment, producing the pre-compensation ratio value may involve adjusting a pre-compensation value in a model of the optical system until an eye diagram or signal quality Q of the modeled system is optimized. The pre-compensation value which provides such optimization may be referred to as $P_o$.

The pre-compensation ratio X for a system which receives input pulses with no chirp may be calculated according to the relation:

$$X = -\frac{DL}{P_o}$$

Where: $P_o$ is the optimum pre-compensation value for a modeled system with an ideal dispersion map;

D is the dispersion of the optical medium in the span; and

L is the length of the optical medium.

Where the input pulse has chirp, the method may involve adjusting pre-compensation values in the model, for two different wavelengths ($\lambda_1$, $\lambda_2$) of light and calculating the precompensaton ratio X by solving the following equations for X and $P_c$:

$$P_{sys}(\lambda_1) = -\frac{D(\lambda_1)L}{X} + P_c$$

$$P_{sys}(\lambda_2) = -\frac{D(\lambda_2)L}{X} + P_c$$

Where: $P_{sys}(\lambda_1)$ is the optimum pre-compensation value for the modeled system at wavelength $X\lambda_1$;

$P_{sys}(\lambda_2)$ is the optimum compensation value for the modeled system at wavelength $\lambda_2$;

$P_c$ is an extra pre-compensaton value, required when the input pulse has chirp;

D is the dispersion of the optical medium in the span; and

L is the length of the optical medium.

In another embodiment, producing the pre-compensaton ratio X may involve operating an optical system with an ideal dispersion map and adjusting pre-compensation in the optical system until an eye diagram or signal quality Q of the system is optimized, to produce to a value $P_o$ at which optimization occurs. This value may be used in the following equation to obtain the pre-compensation ratio X.

$$X = -\frac{DL}{P_o}$$

Where: $P_o$ is the optimum pre-compensation value for a modeled system with an ideal dispersion map;

D is the dispersion of the optical medium in the span; and

L is the length of the optical medium.

Where the input pulse has chirp, producing the pre-compensation ratio X may involve determining a $P_{sys}$ value which optimizes an optical system having an ideal dispersion map and then setting up an experimental system and varying the dispersion produced by a chirped fiber grating in the experimental system until a minimum width pulse is received at an output of the system. Accordingly, the pre-compensation ratio X may be calculated according to the relation:

$$P_{sys} = -\frac{DL}{X} + Pc$$

Where: $P_c$ is the dispersion of the chirped fiber grating when it has been stretched to produce a pulse of minimum width at a receiver of the system;

D is the dispersion of the optical medium in the span;

L is the length of the optical medium; and $P_{sys}$ is the system pre-compensaton value which optimizes a representation having an ideal dispersion map optical system.

According to the present invention, when a dispersion map of the system changes due to residual dispersion or statistical variations in the dispersion or the length of the fiber spans or DCMs, the optimum pre-compensation of a fiber span i can be defined as, $$P_i = -\frac{D_i L_i}{X}$$

Where: $D_i$ and $L_i$ are, respectively, the dispersion and length of the fiber span i.

Optimum pre-compensation of a system consisting of N spans may be calculated by selecting a pre-compensation, $P_s$, which satisfies the following condition:

$$\min \sum_{i=1}^{N} (P_s - P'_i)^2 \text{ or}$$

$$\frac{\partial}{\partial Ps} \sum_{i=1}^{N} (P_s - P'_i)^2 = 0$$

or
where:

$$P'_1 = P_1 \text{ and } P'_i = P_i - \sum_{k=1}^{i-1} (D_k L_k + d_k l_k) \text{ for } i = 2 \ldots N$$

and $d_k$ and $l_k$ are, respectively, the dispersion and length of dispersion compensating fiber (DCF) inside the DCM at the $k_{th}$ span.

In practice, producing a system precompensaton value may involve measuring accumulated dispersion at an output of a dispersion compensation module (DCM) of each span of optical medium in the system, measuring dispersion of each DCM in the system, calculating an average pre-compensation value according to the relation:

$$\overline{P}_i = \frac{1}{N} \sum_{i=1}^{N} \frac{-D_i L_i}{X} = -\frac{1}{N \cdot X} \left[ D_{accum}(N) - \sum_{i=1}^{N} D_{dcm}(i) \right]$$

Where: where $D_i$ and $L_i$ are, respectively, the dispersion and length of a fibers pan i;

$D_{accum}(N)$ is the accumulated dispersion at the output of the last ($N_{th}$) DCM in the system; and $D_{dcm}(i)$ is the dispersion compensation provided by the $i_{th}$ DCM.

calculating an accumulated dispersion value representing the accumulated dispersion at the last DCM, according to the relation:

$$D_{accum}(N) = \sum_{k=1}^{N} (D_k L_k + d_k l_k)$$

Where: $D_k$ and $L_k$ are, respectively, the dispersion and length of the $k_{th}$ span of optical medium;

$d_k$ and $l_k$ are, respectively, the dispersion and length of dispersion compensating fiber (DCF) inside the DCM at the $k_{th}$ span: and calculating a system pre-compensation value according to the relation:

$$P_s = \overline{P}_i - \overline{D}_{accum}$$

Where:

$$\overline{D}_{accum} = \frac{1}{N} \sum_{k=1}^{N} \sum_{k=1}^{i-1} (D_k L_k + d_k l_k)$$

In accordance with another aspect of the invention, there is provided a further method of obtaining an optimum pre-compensation value $P_{wdm}$ by balancing power profiles of a pulse in positive and negative chirped regions of the system, This may involve measuring the dispersion and length of each span in the system, measuring dispersion of each DCM in the system, calculating an accumulated dispersion value for each span; adjusting pre-compensation in the system and selecting an optimum pre-compensation $P_{wdm}$ such that:

$$\sum_{i=1}^{N} \int_{0}^{L+l} sign(P_{wdm} + D_{accum}(i-1) + D_{span}(i, Z))P(Z)dZ = 0$$

Where: sign() is a function which returns the sign of its argument.;

$D_{accum}(i)$ is the accumulated dispersion at the end of each span i after its DCM:

$$D_{accum}(0) = 0 \text{ and } D_{accum}(i) \sum_{k=1}^{i} (D_k L_k + d_k l_k)$$

for i=1, ..., N−1

$D_{span}(i,Z)$ is the accumulated dispersion within each span i:

$D_{span}(i,Z)=DiZ$ when $Z \leq Li$ $D_{span}(i,Z)=DiLi+di(Z-Li)$ when $Li \leq Z \leq Li+li$; and P(Z) is the profile of the total power of a pulse as it travels down the fiber in each span i.

In accordance with another aspect of the invention, there is provided a computer readable medium for providing instructions operable to direct a processor circuit to receive a pre compensation ratio value representing a ratio of dispersion and length to optimum pre-compensation for a span of optical medium in the optical system and to produce a system pre-compensation value as a function of dispersion and length of each span in the optical system such that differences between actual pre-compensation and optimum pre-compensation in each span of the system are minimized.

In accordance with another aspect of the invention, there is provided an apparatus for determining optimum pre-compensation in an optical system, comprising provisions for receiving a pre-compensation ratio value representing a ratio of dispersion and length to optimum pre-compensation, for a span of optical medium in optical system; and provisions for producing a system pre-compensation value as a function of dispersion and length of each span in optical system such that differences between actual pre-compensation and optimum pre-compensation in each span of the system are minimized.

In accordance with another aspect of the invention, there is provided a signal embodied in a carrier wave, comprising a first segment for directing a processor circuit to receive a pre-compensation ratio value representing a ratio of dispersion and length to optimum pre-compensation, for a span of optical medium in the optical system and a second segment for directing a processor circuit to produce a system pre-compensation value as a function of dispersion and length of each span in the optical system such that differences between actual pre-compensation and optimum pre-compensation in each span of the system are minimized.

In accordance with another aspect of the invention, there is provided a computer readable medium for providing instructions readable by a processor circuit for determining optimum pre-compensation in an optical system, the instructions directing the processor circuit to produce an optimum pre-compensation value $P_{wdm}$ by balancing power profiles of pulses in positive and negative chirped regions of the system.

In accordance with another aspect of the invention, there is provided a system for determining optimum precompensaton in an optical system, comprising a device for balancing power profiles in positive and negative chirped regions of the system and for determining a pre-compensation value associated with balancing.

In accordance with another aspect of the invention, there is provided a signal embodied in a carrier wave, the signal comprising a code segment for providing instructions to a processor circuit for determining optimum pre-compensation in an optical system, the instructions being operable to direct the processor circuit to produce an optimum pre-compensation value $P_{wdm}$ by balancing power profiles of pulses in positive and negative chirped regions of the optical system.

In accordance with one aspect of the invention there is provided a method of optimizing performance in an optical system involving adjusting at least one of optical medium span length, optical medium dispersion and system pre-compensation to produce a pre-compensation ratio $$-\frac{DL}{P_o}$$

within the range of 2 to 9, depending upon the type of optical medium, DCM, and power of the input pulse to each span.

The method may involve producing a pre-compensation ratio in a range of about 3 to 5, 3.5 to 4.5, 3.2 to 4.2, and/or 4.6 to 5.6, depending upon the type of optical medium DCM and power of the input pulse to each span.

The method may involve producing a pre-compensation ratio of about 3.4, 4.0, 4.9, 3.6, 3.9, 4.4, 3.2. 3.8. 4.1, 4.6, 5.4, or 5.6.

The present invention provides simple and effective methods for determining a desirable pre-compensation value, without requiring new simulations each time the dispersion map for a system changes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
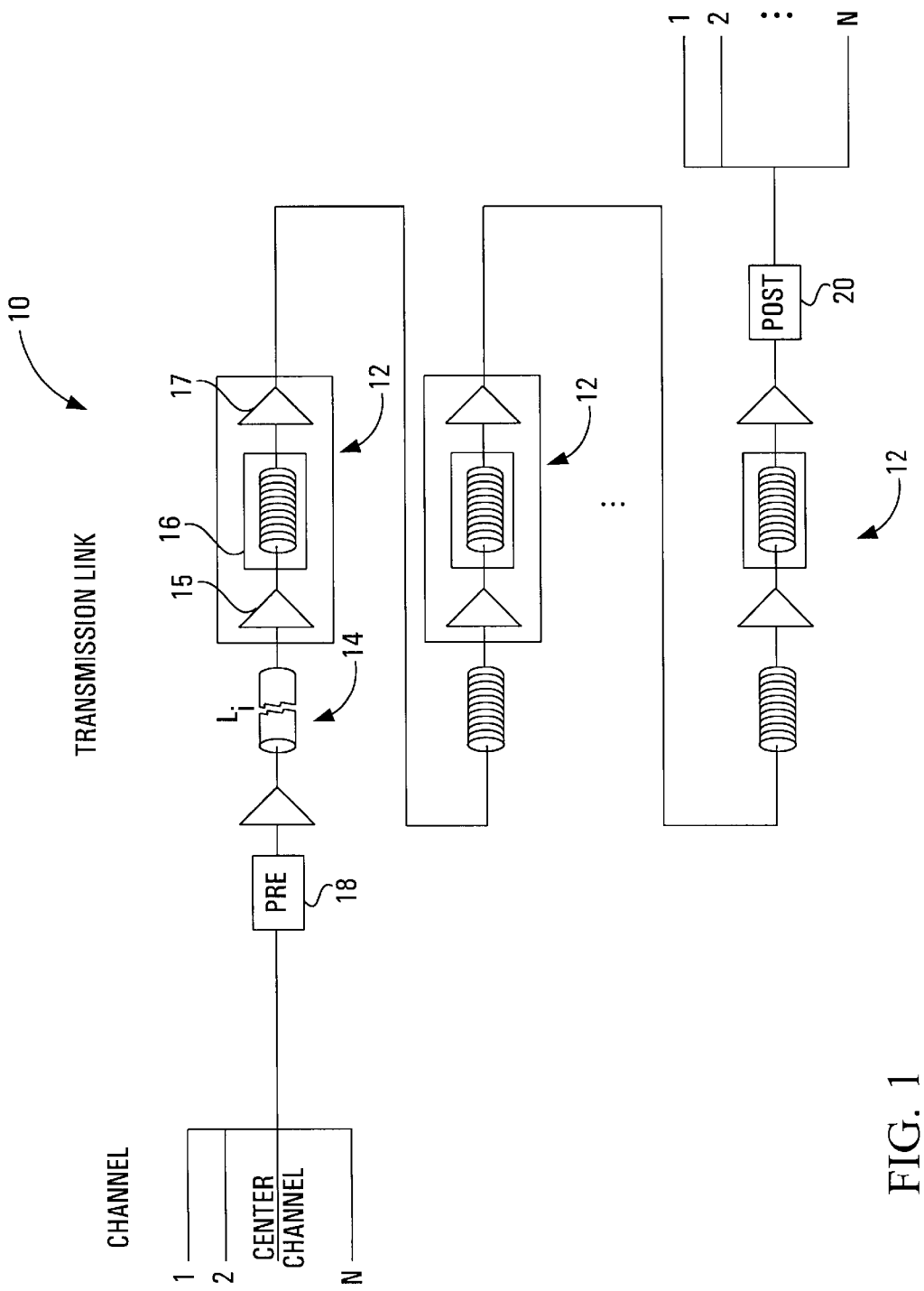
FIG. 1 is a schematic diagram of a system for which pre-compensation is desired to be selected.

Referring to FIG. 1, an optical transmission link system is shown generally at 10. The system has a plurality of spans 12, each comprised of a length $L_i$ of an optical medium 14, such as fiber optic cable having a dispersion $D_i$, and an associated dispersion compensation module (DCM) 16, which may be positioned between first and second optical amplifiers such as Erpium Doped Fibre Amplifiers (EDFA)s 15 and 17 of the span 12. Each dispersion compensation module 16 compensates its respective span 12 of optical medium for signals at a wavelength of a center channel in the optical system. Despite the individual compensation provided by each DCM 16, the system also includes a system pre-compensation device 18 and a system post compensation device 20, to provide overall system pre- and post-compensation for improving overall system performance. It will be appreciated that the system may have positive or negative chirped regions in which the frequency of pulses of light in the system is increased or decreased, respectively.

Figure 2:
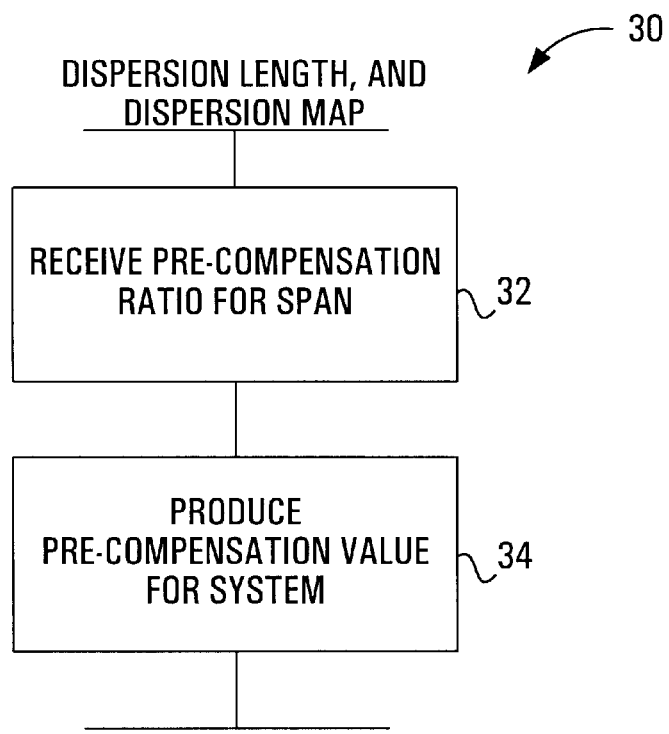
FIG. 2 is a flowchart of a process by which system pre-compensation can be calculated, according to a first embodiment of the invention.

According to a first embodiment of the invention, a method for determining optimum pre-compensation in an optical system of the type described in FIG. 1, is shown generally at 30 in FIG. 2. Essentially, the method involves an act 32 of receiving a pre-compensation ratio value representing a ratio of dispersion and length to optimum pre-compensation, for a span of optical medium in a representative optical system (not shown) and an act 34 of producing a system pre-compensation value as a function of dispersion and length of each span in the optical system. Alternatively or additionally, the method may involve producing a pre-compensation ratio value may be produced in response to dispersion, length and optimum pre-compensation determined from an ideal dispersion map, for a span of optical medium in a representative optical system (not shown).

After producing the system pre-compensation value, a suitable pre-compensation device may be selected for use in pre-compensating signals in the optical system 10. This method minimizes single channel penalty in the system 10.

Figure 3:
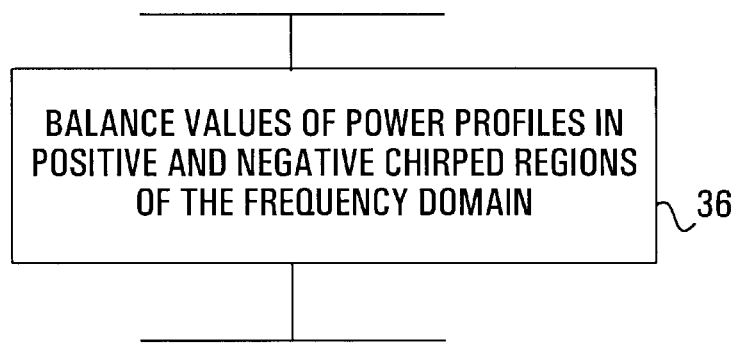
FIG. 3 is a flowchart of a process by which system pre-compensation can be calculated, according to a second embodiment of the invention.

Referring to FIG. 3, according to a second embodiment of the invention, an optimum pre-compensation value $P_{wdm}$ may be obtained by the act 36 of balancing power profiles of pulses in positive and negative chirped regions of the system. The method according to the second embodiment minimizes cross-phase modulations (XPM) in WDM systems.

First Embodiment

Referring back to FIG. 2, considering the method according to the first embodiment of the invention, the first act 32 may be carried out by providing a computer with a suitable value for the pre-compensation ratio X. Alternatively, or in addition, X may be produced by computer modeling or by experiment, for example.

Finding X by Modeling

Figure 4:
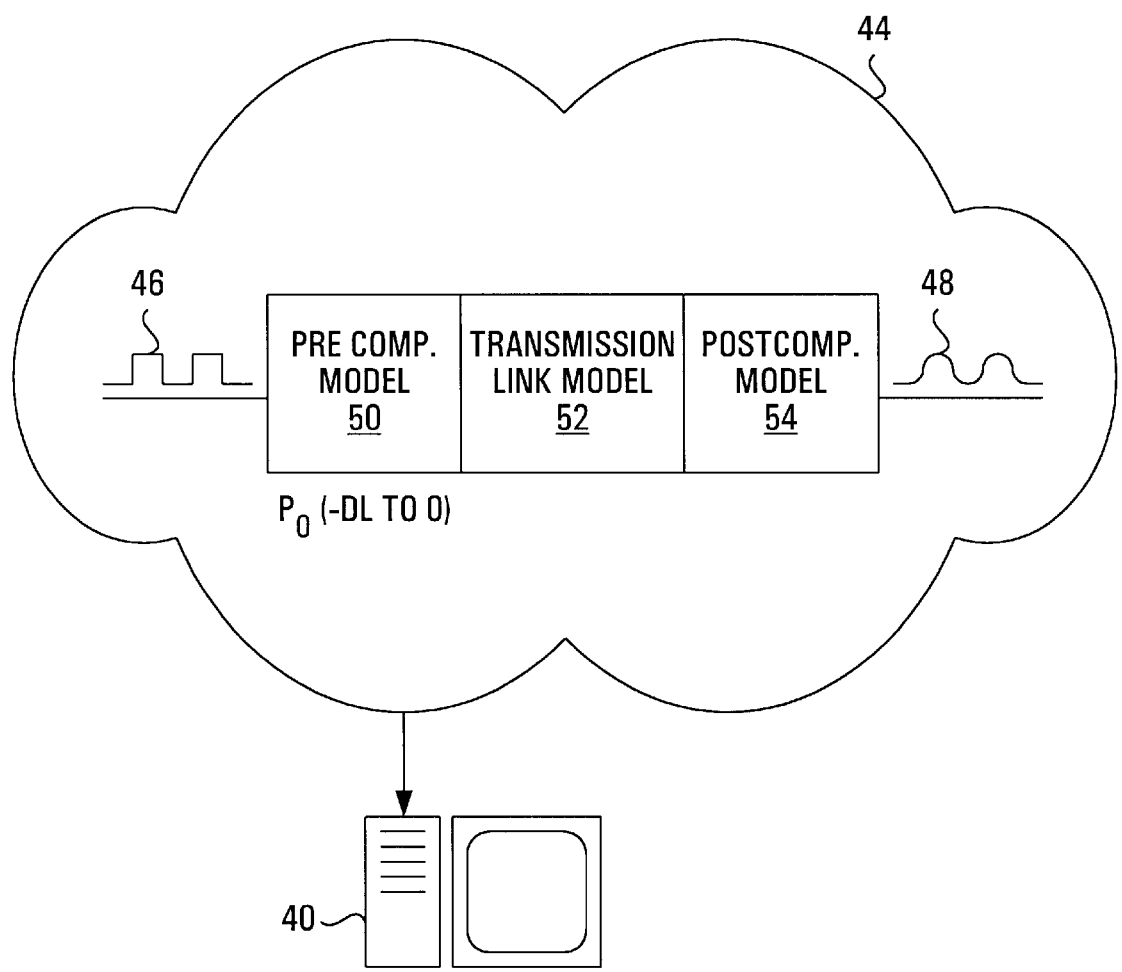
FIG. 4 is a schematic representation of a computer operating a mathematical model, according to the first embodiment of the invention.
Figure 5:
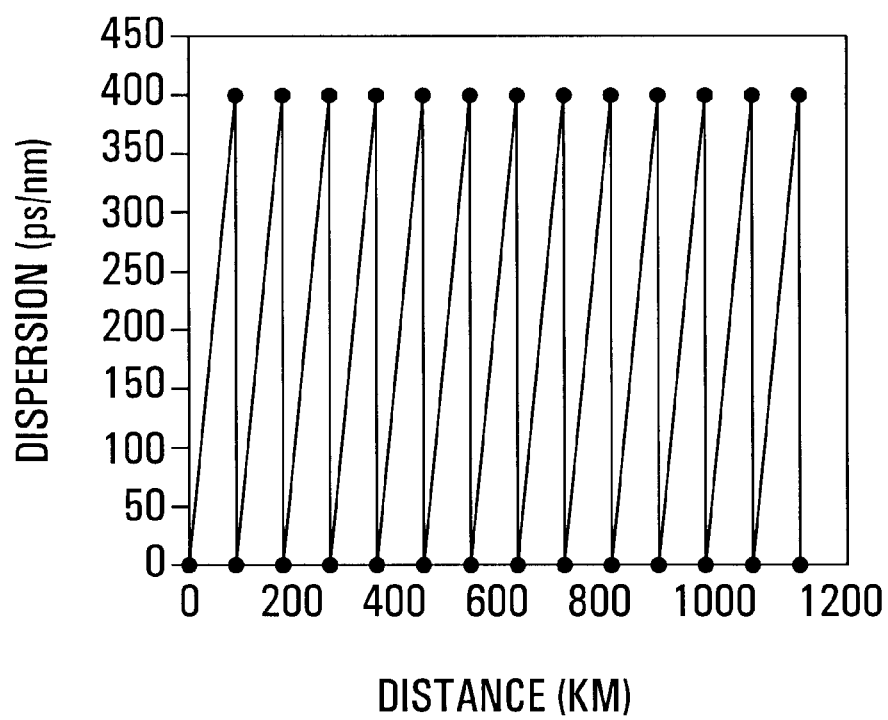
FIG. 5 is a representation of an ideal dispersion map of a representative optical system.

Referring to FIG. 4, to produce X by computer modeling, a computer 40 is suitably configured to receive data relating to dispersion and length of each span in an optical medium of a mathematically implemented representative optical system, and data providing an optimum pre-compensation value for each span of the representative system, such as may be provided by an ideal dispersion map such as shown at 42 in FIG. 5, for the representative system, An ideal dispersion map is a representation of dispersion versus distance for a system having spans of optical medium of constant dispersion at a given wavelength and equal length and DCMs which perfectly compensate the dispersion created in each corresponding span.

Figure 6:
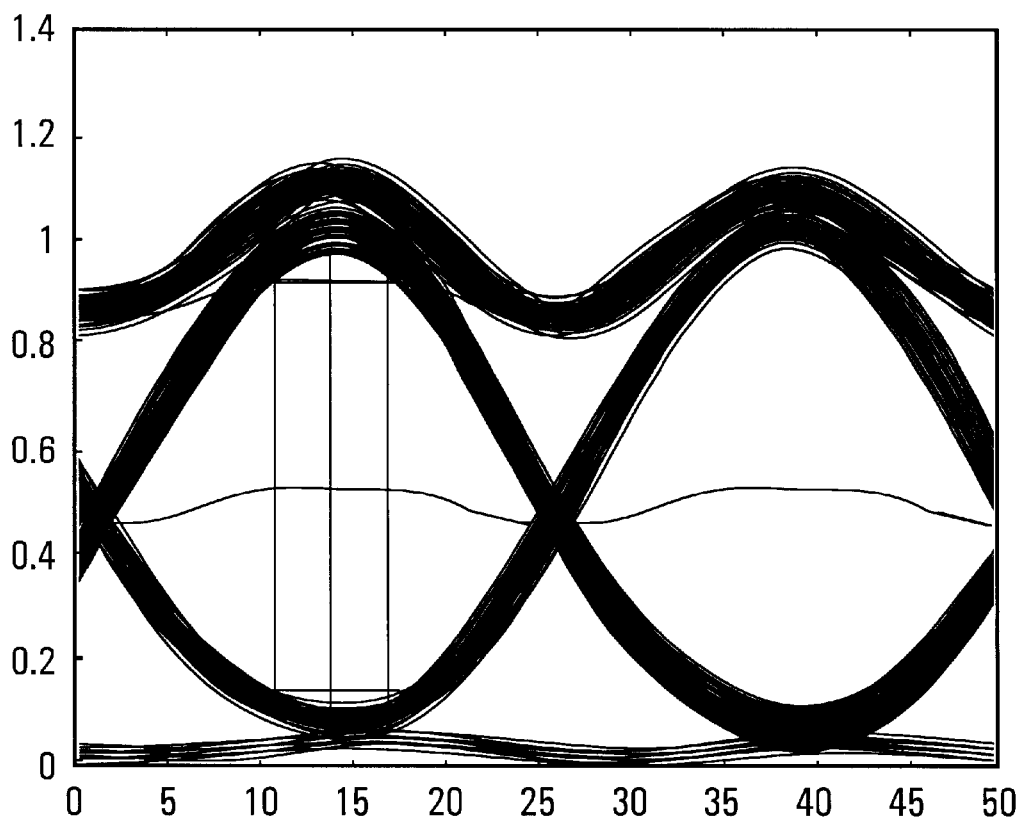
FIG. 6 is a representation of an eye diagram produced by the mathematical model of the representative system.

Referring to FIG. 4, the computer is programmed to mathematically implement the representative optical system by a model 44 of the signal transmission characteristics of the representative optical system, to provide a single channel simulation in such a manner that representations 46 of input pulses may be provided to the model 44 such that the model produces representations 48 of output pulses. More particularly, it is desirable that the computer be programmed to produce an eye diagram of the type shown at 49 in FIG. 6. for example, or to produce a representation of signal quality Q of the representative system.

Referring back to FIG. 4, in this embodiment, the model 44 includes a pre-compensation stage 50 a transmission link stage 52 and a post-compensation stage 54. The pre-compensation stage 50 is operable to produce a plurality of pre-compensation values for use in modeling pre-compensation and the post compensation stage 54 is operable to produce post-compensation values for use in modeling post-compensation of the representative system.

In this embodiment producing the pre-compensation ratio value involves adjusting pre- and post-compensation values in the computer model 44, while providing to the model 44 input representations 46 at a single, center channel wavelength, until the eye diagram 49 of the representative system is optimized, or until a Q value of the representative system is optimized. The pre-compensation values may be adjusted from −DL to 0, for example.

Once optimization of the eye diagram or signal Q has occurred, the system pre-compensation value $P_o$, which produces optimization is used in an equation to calculate the pre-compensation ratio X. In this embodiment, the pre-compensation ratio X is calculated according to the relation:

$$X = -\frac{DL}{P_o}$$

Where: $P_o$ is the optimum pre-compensation of the representative system, and D and L are, respectively, the dispersion and length of the optical medium in each span 12.

Ultimately, the pre-compensation ratio X varies with non-linearity of the actual system 10, and therefore it changes with system parameters, such as optical media type or optical power input into the medium. It also depends on other system parameters, such as pulse shape, optical media span length and amplifier spacing.

Alternatively, if there is chirp in pulses received by the system, the above optimization should be carried out with input signal representations 46 representing signals at two different wavelengths to obtain two pre-compensation values $P_{sys}(\lambda_1)$ and $P_{sys}(\lambda_2)$ in which case the pre-compensation ratio is calculated by solving the following equations for X and $P_c$:

$$P_{sys}(\lambda_1) = -\frac{D(\lambda_1)L}{X} + P_c$$

$$P_{sys}(\lambda_2) = -\frac{D(\lambda_2)L}{X} + P_c$$

Where: $P_{sys}(\lambda_1)$ is the optimum pre-compensation value for the modeled system at wavelength $\lambda_1$;

$P_{sys}(\lambda_2)$ is the optimum pre-compensation value for the modeled system at wavelength $\lambda_2$;

$P_c$ is an extra pre-compensation value;

D is the dispersion of the optical medium in the span; and

L is the length of the optical medium.

Experimental Method for Finding X

To carry out the first part of the method for producing a pre-compensation ratio according to the first embodiment of the invention, by experiment, a representative single channel optical system (not shown) is actually set up such that the representative system has an ideal dispersion map of the type shown in FIG. 5. Next, the representative system is operated with input pulses of a single, center channel wavelength, while the pre-compensation and post compensation are varied until eye diagram or signal Q optimization is observed. When this occurs, the representative system pre-compensation which produces optimization is measured to obtain a pre-compensation value $P_o$. This pre-compensation value is then used in the equation above to produce the pre-compensation ratio value X.

Figure 7:
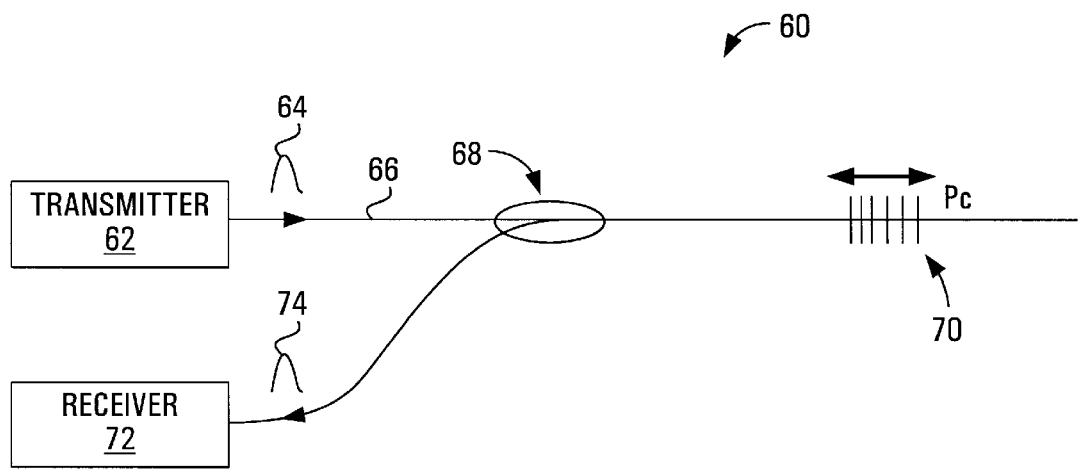
FIG. 7 is a representation of a system for experimentally measuring extra pre-compensaton $P_c$ for a system having chirp in input pulses.

For a system in which there is chirp in the input pulse, the same procedure as that described above may be used to find a value $P_{sys}$. Then, a system of the type shown at 60 in FIG. 7, may be used to determine an extra compensation $P_c$ required in such a system. In the system of FIG. 7, a transmitter 62 is operable to transmit pulses 64 into a short length of calibrated optical medium 66 in communication with a circulator 68 and a chirped fiber grating 70. A receiver 72 is in communication with the circulator 68 to receive pulses 64 transmitted by the transmitter 62 after passing through the optical medium 66, and the chirped fiber grating 70. A chirped fiber grating 70 is stretched longitudinally until a pulse 74 with minimum width is received at the receiver 72. Then the pre-compensation ratio X may be calculated according to the relation:

$$P_{sys} = -\frac{DL}{X} + P_c$$

Where: $P_c$ is the dispersion of the chirped fiber grating 70 when it has been stretched to produce a pulse of minimum width at the receiver 72.

It has been found that using the methods described herein optimum performance of certain optical systems can be achieved using values of X within the range of 2 to 9, especially for optical medium spans such as a 13×80 km transmission link In such systems employing True Wave Classic (TWC) fiber as the optical medium, X ratios within the range of between about 3 to 5 have been found to optimize such systems. For example, for pulse of powers of 1, 3 and 5 dBm emitted into a fiber of this type, X ratios of 3.4, 4.0, and 4.9 respectively have been found to optimize the optical system.

In such systems employing True Wave Reduced Slope (TWRS) fiber as the optical medium, X ratios within the range of between about 3.5 to 4.5 have been found to optimize such systems. For example, for pulse powers of 1, 3 and 5 dBm emitted into a fiber of this type, X ratios of 3.6, 3.9, and 4.4 respectively have been found to optimize the optical system.

In such systems employing Large Effective Area Fiber (LEAF) as the optical medium, X ratios within the range of between about 3.2 to 4.2 have been found to optimize such systems. For example for pulse powers of 1, 3 and 5 dBm emitted into a fiber of this type, X ratios of 3.2, 3.8, and 4.1 respectively have been found to optimize the optical system.

In such systems employing Non-Dispersion Shifted Fiber (NDSF) as the optical medium, X ratios within the range of between about 4.6 to 5.6 have been found to optimize such systems. For example for pulse powers of 1, 3 and 5 dBm emitted into a fiber of this type, X ratios of 4.6, 5.4, and 5.6 respectively have been found to optimize the optical system.

Use of X to Find System Pre-compensation

Figure 8:
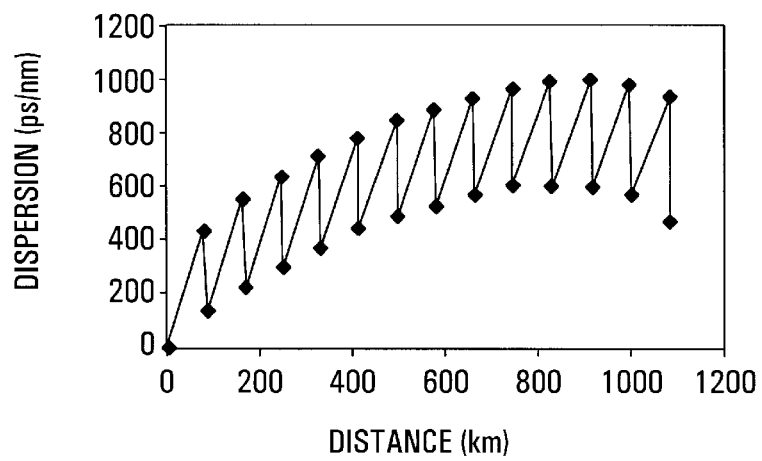
FIG. 8 is a representation of a dispersion map for the system shown in FIG. 1.

After being provided with a value X, or after having calculated a pre-compensation ratio X, using computer modeling or experimentation with a system having an ideal dispersion map, optimum pre-compensation for systems 10 such as shown in FIG. 1, having dispersion maps with statistical variations, as shown in FIG. 8, can be calculated using a least-squares method to accomplish act 34 in FIG. 2.

This method may involve trying different pre-compensations ($P_s$) in the model or test system to satisfy the following equation:

$$\min \sum_{i=1}^{N} (P_s - P'_i)^2$$

Where:

$$P'_1 = P_1 \text{ and } P'_i = P_i - \sum_{k=1}^{i-1} (D_k L_k + d_k l_k) \text{ for } i = 2 \ldots N$$

$D_k$ and $L_k$ are, respectively, the dispersion and length of the $k_{th}$ span of optical medium;

and $d_k$ and $l_k$ are, respectively, the dispersion and length of dispersion compensating fiber (DCF) inside the DCM at the $k_{th}$ span and $$P_i = -\frac{D_i L_i}{X}$$

where: $D_i$ and $L_i$ are, respectively, the dispersion and length of the fiber span i.

Alternatively, selection of an optimum pre-compensation value may involve producing a system pre-compensation value by measuring accumulated dispersion $D_{accum}(i)$ at an output of a DCM 16 of each span 12 in the system 10. The accumulated dispersion at the end of each span 12 may be represented mathematically by:

$$D_{accum}(i) = \sum_{k=1}^{i} (D_k L_k + d_k l_k)$$

Where: $D_k$ and $L_k$ are, respectively, the dispersion and length of the $k_{th}$ span of optical medium;

$d_k$ and $l_k$ are, respectively, the dispersion and length of dispersion compensating fiber (DCF) inside the DCM at the $k_{th}$ span.

In addition, the dispersion of each DCM 16 in the system 10 may be measured. Then, an average pre-compensation value $P_i$ may be calculated from the relation:

$$\overline{P}_i = \frac{1}{N}\sum_{i=1}^{N}\frac{-D_i L_i}{X} = -\frac{1}{N \cdot X}\left[D_{accum}(N) - \sum_{i=1}^{N} D_{dcm}(i)\right]$$

Where: where $D_i$ and $L_i$ are, respectively, the dispersion and length of the fiber span i;

$D_{accum}(N)$ is the accumulated dispersion at the output of the last ($N_{th}$) DCM in the system; and $D_{dcm}(i)$ is the dispersion compensation provided by the $i_{th}$ DCM.

In addition, an average accumulated dispersion value representing the accumulated dispersion at the last DCM may be calculated according to the relation:

$$\overline{D}_{accum} = \frac{1}{N}\sum_{i=1}^{N-1} D_{accum}(i)$$

Then a system pre-compensation value $P_s$ may be calculated according to the relation:

$$P_s = \overline{P}_i - \overline{D}_{accum}$$

The pre-compensation value $P_s$ calculated according to the above method is best suited for single channel systems, or WDM systems in which self phase impairment (SPM) is dominant. The accuracy of the calculation has been found to be as good as approximately ±10 ps/nm, for fiber types such as True Wave Classic.

The above optimum precompensaton $P_o$ or $P_s$ is for a system in which there is no chirp in the input pulses. When there is chirp in input pulses, the system optimum pre-compensation, $P_{sys}$, is given by, $$P_{sys} = P_o + P_c$$

or $$P_{sys} = P_s + P_c$$

Where: $P_c$ is the extra pre-compensation required where there is chirp in the input pulse. ($P_c$ can be obtained through single channel simulation or experiment.)

It will be appreciated that instructions for directing a processor circuit such as that found in a computer, may be provided or supplied by a computer readable medium for providing instructions readable by the processor circuit, for determining optimum pre-compensation in an optical system according to the above methods.

Alternatively, such instructions may be provided to the computer in a signal embodied in a carrier wave, the instructions being provided by various segments of program code, for example. In general, the instructions may direct the processor circuit to receive a pre-compensation ratio value or to produce an optimum pre-compensation value in response to dispersion, length and optimum pre-compensation determined from an ideal dispersion map, for a span of optical medium in the optical system and to produce a system pre-compensation value as a function of dispersion and length of each span in the optical system such that differences between actual pre-compensation and optimum pre-compensation in each span of the system are minimized.

When a computer is programmed by the instructions described above, the computer effectively acts as a system for determining optimum pre-compensation in an optical system.

Second Embodiment

In accordance with the second embodiment of the invention, the method involves selecting an optimum pre-compensation, $P_{wdm}$, which results in balancing power profile integrals of pulses in positive and negative chirp regions of the system 10. In other words, it involves selecting a $P_{wdm}$ which satisfies the following condition:

$$\sum_{i=1}^{N} \int_0^{L+l} sign(P_{wdm} + D_{accum}(i-1) + D_{span}(i, Z))P(Z)dZ = 0$$

Where: sign() is a function which returns the sign of its argument;

$D_{accum}(i)$ is the accumulated dispersion at the end of each span i after its respective DCM:

$$D_{accum}(0) = 0 \text{ and } D_{accum}(i) = \sum_{k=1}^{i}(D_k L_k + d_k l_k) \text{ for } i = 1, \ldots N;$$

$D_{span}(i,Z)$ is the accumulated dispersion within each span i:

$D_{span}(i,Z) = D_i Z$ when $Z \leq L_i$ $D_{span}(i,Z) = D_i L_i + d_i (Z - L_i)$ when $L_i \leq Z \leq L_i + l_i$; and $P(Z)$ is the profile of the total power of a pulse as it travels down the fiber in each span i.

As an example of a practical case, where the non-linear effect of the optical medium is much larger than that of a DCM, a typical power profile can be approximated by:

$P(Z) = P_{in} e^{-\alpha Z}$ when $Z \leq L_i$ $P(Z) = 0$ when $L_i \leq Z \leq L_i + l_i$ where $P_{in}$ is the initial power at the beginning of the span, and $\alpha$ is the attenuation coefficient of the transmission fiber.

Since the right-hand side the Integral of equation is zero, $P_{wdm}$ is independent of $P_{in}$.

When chirp is in the input pulse, the system pre-compensation, $P_{sys\_wdm}$, is given by the relation:

$$P_{sys\_wdm} = P_{wdm} + P_c$$

To employ the above equations, the dispersion $D_i$ and length $L_i$ of each span i in the system are measured and the dispersion of each DCM in the system is measured. Then, an accumulated dispersion value may be calculated for each span, according to the relation:

$$D_{accum}(i) = \sum_{k=1}^{i}(D_k L_k + D_{dcm}(k)) \text{ for } i = 1, \ldots, N$$

Where: $D_k$ and $L_k$ are, respectively, the dispersion and length of the $k_{th}$ span of optical medium, $D_{dcm}(k)$ is the dispersion compensation provided by the $i_{th}$ DCM.

Next the system is operated and pre-compensation of the system is adjusted over a range and an optimum pre-compensation $P_{wdm}$ is selected such that:

$$\sum_{i=1}^{N} \int_0^{L+l} sign(P_{wdm} + D_{accum}(i-1) + D_{span}(i, Z))P(Z)dZ = 0$$

Where: $P(Z)$ is the power profile approximated by, $P(Z) = e^{-\alpha Z}$ when $Z \leq L_i$ $P(Z) = 0$ when $L_i \leq Z \leq L_i + l_i$ The above method is most suitable for WDM systems, especially systems which have dispersion maps in which the XPM impairment is dominant.

It will be appreciated that instructions for directing a processor circuit such as that found in a computer, may be provided or supplied by a computer readable medium for providing instructions readable by the processor circuit, for determining optimum pre compensation in an optical system. Alternatively, such instructions may be provided in a signal embodied in a carrier wave, the instructions being provided by various segments of program code, for example. In general, the instructions may direct the processor circuit to produce an optimum pre-compensation value $P_{wdm}$ by balancing power profiles of pulses in positive and negative chirped regions of the system.

When a computer is programmed by the instructions described above, the computer effectively acts as a system for determining optimum pre-compensation in an optical system, according to the above methods.

Although only a specific type of multi-span RZ system is shown in FIG. 1, the current invention can be applied to other dispersion managed multi-span RZ systems. In dispersion managed multi-span RZ systems, which have amplifiers distributed in each span, with more than one fiber type with at least one fiber type having negative dispersion and at least one fiber type having positive dispersion.

While specific embodiments of the invention have been described and illustrated, such embodiments should be considered illustrative of the invention only and not as limiting the invention as construed in accordance with the accompanying claims.

What is claimed is:

1. A method of determining optimum pre-compensation in an optical system, comprising:
   a) receiving a pre-compensation ratio value representing a ratio of dispersion and length to optimum system pre-compensation for a span of optical medium in said optical system; and
   b) producing a system pre-compensation value as a function of said pre-compensation ratio value and dispersion and length of each span in said optical system.

2. The method of claim 1 wherein producing said system pre-compensation value comprises producing a system pre-compensation value such that differences between actual pre-compensation and optimum pre-compensation in each span of said system are minimized.

3. The method of claim 2 wherein producing said system pre-compensation value comprises producing a system pre-compensation value such that the performance of said system is optimized.

4. The method of claim 2 wherein producing said system pre-compensation value comprises determining performance is optimized when an eye diagram produced by said system is optimized.

5. The method of claim 2 wherein producing said system pre-compensation value comprises determining performance is optimized when the signal quality Q of a signal produced by the system is optimized.

6. The method of claim 1 further comprising producing said pre-compensation ratio value in response to dispersion, length and optimum pre-compensation determined from an ideal dispersion map, for a span of optical medium in said optical system.

7. The method of claim 6 wherein producing said pre-compensation ratio value comprises adjusting a pre-compensation value in a model of said optical system until an eye diagram of said system is optimized.

8. The method of claim 6 wherein producing said pre-compensation ratio value comprises adjusting a pre-compensation value in a model of said optical system until a Q value is optimized.

9. The method of claim 7 wherein the pre-compensation ratio X is calculated according to the relation:

$$X = -\frac{DL}{P_o}$$

Where; $P_o$ is the optimum pre-compensation value for a modeled system with an ideal dispersion map;

D is the dispersion of the optical medium in the span; and

L is the length of the optical medium.

10. The method of claim 7 further comprising adjusting pre-compensation values in said model, for two different wavelengths ($\lambda_1, \lambda_2$) of light.

11. The method of claim 10 wherein the pre-compensation ratio X is calculated by solving the following equations for X:

$$P_{sys}(\lambda_1) = -\frac{D(\lambda_1)L}{X} + P_c$$

$$P_{sys}(\lambda_2) = -\frac{D(\lambda_2)L}{X} + P_c$$

Where: $P_{sys}(\lambda_1)$ is the optimum pre-compensation value for the modeled system at wavelength $\lambda_1$;

$P_{sys}(\lambda_2)$ is the optimum pre-compensation value for the modeled system at wavelength $\lambda_2$;

$P_c$ is an extra pre-compensation value, required when the input pulse has chirp;

D is the dispersion of the optical medium in the span; and

L is the length of the optical medium.

12. The method of claim 6 wherein producing said pre-compensation ratio comprises operating said optical system and adjusting pre-compensation in said optical system until an eye diagram of said system is optimized.

13. The method of claim 12 further comprising calculating said pre-compensation ratio X according to the relation:

$$X = -\frac{DL}{P_o}$$

Where: $P_o$ is the optimum pre-compensation value for said optical system, where said optical system has an ideal dispersion map;

D is the dispersion of the optical medium in the span; and

L is the length of the optical medium.

14. The method of claim 12 further comprising varying the dispersion of a chirped fiber grating in said optical system until a minimum width pulse is received at an output of said optical system.

15. The method of claim 14 wherein said pre-compensation ratio X is calculated according to the relation:

$$P_{sys} = -\frac{DL}{X} + P_c$$

Where: $P_c$ is the dispersion of the chirped fiber grating when it has been stretched to produce a pulse of minimum width at a receiver of the system;

D is the dispersion of the optical medium in the span;

L is the length of the optical medium; and $P_{sys}$ is the system pre-compensation value which optimizes a representation having an ideal dispersion map optical system.

16. The method of claim 1 wherein producing a system pre-compensation value comprises:

a) measuring accumulated dispersion at an output of a DCM of each span of optical medium in the system;

b) measuring dispersion of each DCM in the system;

c) calculating an average pre compensation value according to the relation:

$$\overline{P}_i = \frac{1}{N}\sum_{i=1}^{N} \frac{-D_i L_i}{X} = -\frac{1}{N \cdot X}\left[D_{accum}(N) - \sum_{i=1}^{N} D_{dcm}(i)\right]$$

Where: where $D_i$ and $L_i$ are, respectively, the dispersion and length of a fiber span i;

$D_{accum}(N)$ is the accumulated dispersion at an output of the last ($N_{th}$) DCM of the system; and $D_{dcm}(i)$ is the dispersion compensation provided by the $i_{th}$ DCM;

d) calculating an average accumulated dispersion value according to the relation; and $$\overline{D}_{accum} = \frac{1}{N}\sum_{i=1}^{N-1} D_{accum}(i)$$

Where:

$$D_{accum}(i) = \sum_{k=1}^{i} (D_k L_k + d_k l_k)$$

Where $D_k$ and $L_k$ are, respectively, the dispersion and length of the $k_{th}$ span of optical medium;

$d_k$ and $l_k$ are, respectively, the dispersion and length of dispersion compensating fiber (DCF) inside the DCM at the $k_{th}$ span.

e) calculating a system pre-compensation value according to the relation:

$$P_s = \overline{P}_i - \overline{D}_{accum}.$$

17. A method of determining optimum pre-compensation in an optical system, comprising producing an optimum pre-compensation value $P_{wdm}$ by balancing power profiles in the positive and negative chirped regions of the frequency domain, for pulses emitted into an optical medium of the system.

18. The method of claim 17 wherein producing comprises:

a) measuring the dispersion and length of each span in the system;

b) measuring dispersion of each DCM in the system;

c) calculating an accumulated dispersion value for each span;

d) adjusting pre-compensation in the system and selecting an optimum pre-compensation $P_{wdm}$ such that:

$$\sum_{i=1}^{N}\int_{0}^{L+l} sign(P_{wdm} + D_{accum}(i-1) + D_{span}(i, Z))P(Z)dZ = 0$$

Where: sign() is a function which returns the sign of its argument.;

$D_{accum}(i)$ is the accumulated dispersion at the end of each span i after its DCM:

$$D_{accum}(0) = 0, \text{ and } D_{accum}(i) = \sum_{k=1}^{i} (D_k L_k + d_k l_k)$$

for i=1, . . . N;

$D_{span}(i,Z)$ is the accumulated dispersion within each span i;

$D_{span}(i,Z)$=Di Z when $Z \leq Li$ $D_{span}(i,Z)$=$D_i L_i$+di(Z−Li) when $L_i \leq Z \leq L_i + l_i$; and P(Z) is the profile of the total power of a pulse as it travels down the fiber in each span i.

19. A computer readable medium for providing instructions operable to direct a processor circuit to:

a) receive a pre-compensation ratio value representing a ratio of dispersion and length to optimum pre-compensation, for a span of optical medium in said optical system; and b) produce a system pre-compensation value as a function of dispersion and length of each span in said optical system such that differences between actual pre compensation and optimum pre-compensation in each span of said system are minimized.

20. An apparatus for determining optimum pre-compensation in an optical system, comprising:

a) means for producing a pre-compensation ratio value in response to dispersion, length and optimum pre-compensation determined from an ideal dispersion map, for a span of optical medium in said optical system; and b) means for producing a system pre-compensation value as a function of dispersion and length of each span in said optical system such that differences between actual pre-compensation and optimum pre-compensation in each span of said system are minimized.

21. A signal embodied in a carrier wave, comprising:

a) a first segment for directing a processor circuit to receive a pre-compensation ratio value representing a ratio of dispersion and length to optimum pre-compensation, for a span of optical medium in said optical system; and b) a second segment for directing a processor circuit to produce a system pre-compensation value as a function of dispersion and length of each span in said optical system such that differences between actual pre-compensation and optimum pre-compensation in each span of said system are minimized.

22. A computer readable medium for providing instructions readable by a processor circuit for determining optimum pre-compensation in an optical system, said instruction directing said processor circuit to produce an optimum pre-compensation value $P_{wdm}$ by balancing power profiles of pulses in the positive and negative chirped regions of the system.

23. A system for determining optimum pre-compensation in an optical system, comprising a device for balancing power profiles of pulses in positive and negative chirped regions the system and for determining a pre-compensation value associated with said balancing.

24. A signal embodied in a carrier wave, said signal comprising a code segment for providing instructions to a processor circuit for determining optimum pre-compensation in an optical system, said instructions being operable to direct said processor circuit to produce an optimum pre-compensation value $P_{wdm}$ by balancing power profiles of pulses in the positive and negative chirped regions of the system.

25. A method of optimizing performance in an optical system, comprising: adjusting at least one of optical medium span length, optical medium dispersion and system pre-compensation to produce a pre-compensation ratio $$-\frac{DL}{P_o}$$

within the range of 2 to 9.

26. The method of claim 25 wherein producing comprises producing a pre-compensation ratio of about 3 to 5.

27. The method of claim 25 wherein producing comprises producing a pre-compensation ratio of about 3.5 to 4.5.

28. The method of claim 25 wherein producing comprises producing a pre-compensation ratio of about 3.2 to 4.2.

29. The method of claim 25 wherein producing comprises producing a pre-compensation ratio of about 4.6 to 5.6.

30. The method of claim 26 wherein producing comprises producing a pre-compensation ratio of about 3.4.

31. The method of claim 26 wherein producing comprises producing a pre-compensation ratio of about 4.0.

32. The method of claim 26 wherein producing comprises producing a pre-compensation ratio of about 4.9.

33. The method of claim 27 wherein producing comprises producing a pre-compensation ratio of about 3.6.

34. The method of claim 27 wherein producing comprises producing a pre-compensation ratio of about 3.4.

35. The method of claim 27 wherein producing comprises producing a pre-compensation ratio of about 4.4.

36. The method of claim 28 wherein producing comprises producing a pre-compensation ratio of about 3.2.

37. The method of claim 28 wherein producing comprises producing a pre-compensation ratio of about 3.9.

38. The method of claim 28 wherein producing comprises producing a pre-compensation ratio of about 4.1.

39. The method of claim 29 wherein producing comprises producing a pre-compensation ratio of about 4.6.

40. The method of claim 29 wherein producing comprises producing a pre-compensation ratio of about 5.4.

41. The method of claim 29 wherein producing comprises producing a pre-compensation ratio of about 5.6.

* * * * *